Dec. 8, 1925.
J. H. PHILLIPS, JR
FLEXIBLE PIPE
Filed April 13, 1922
1,564,270
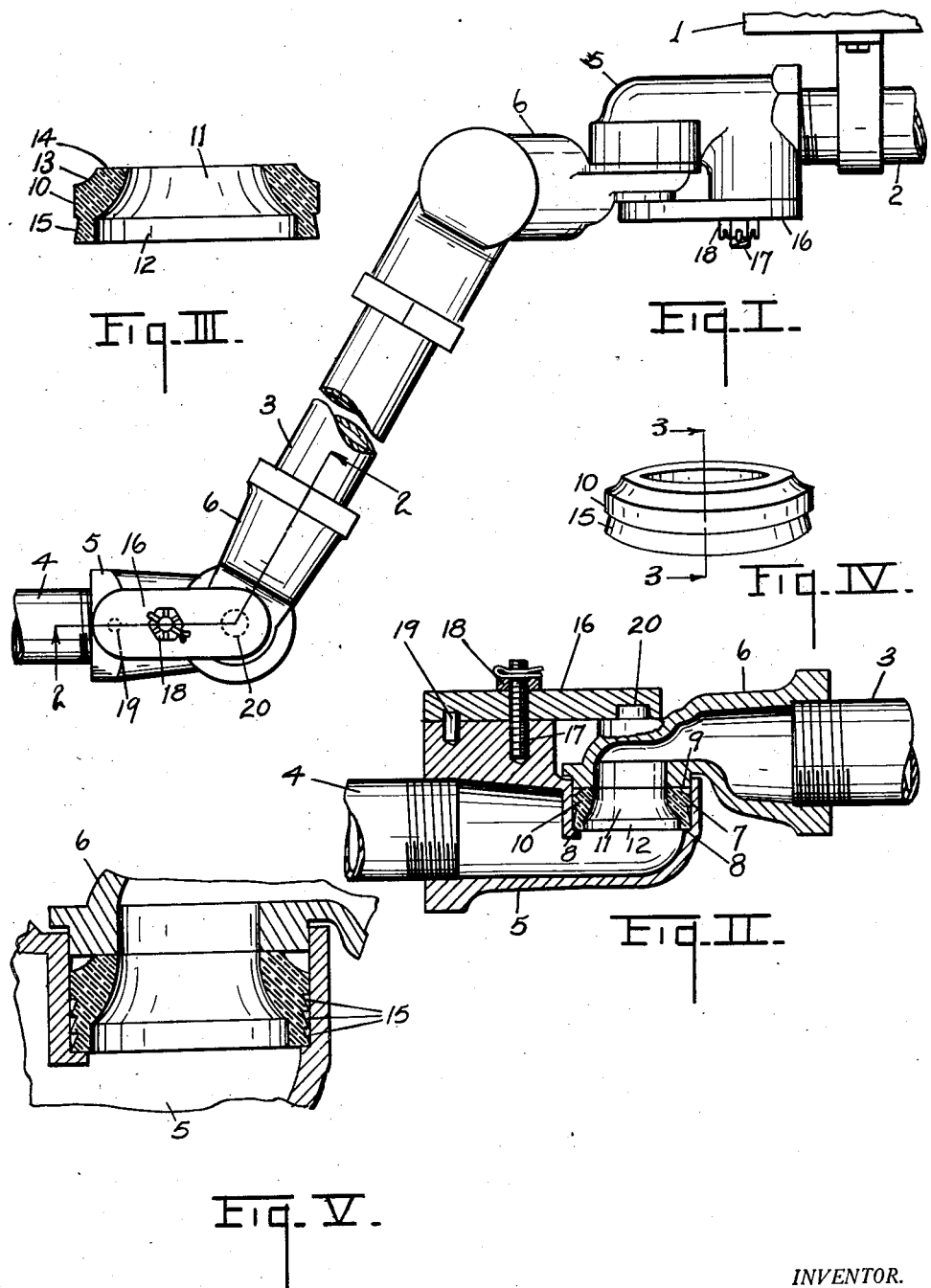
INVENTOR.
John H. Phillips Jr.
BY Chappell & Earl
ATTORNEYS.

Patented Dec. 8, 1925.

1,564,270

UNITED STATES PATENT OFFICE.

JOHN HENRY PHILLIPS, JR., OF JACKSON, MICHIGAN.

FLEXIBLE PIPE.

Application filed April 13, 1922. Serial No. 552,143.

*To all whom it may concern:*

Be it known that I, JOHN H. PHILLIPS, Jr., a citizen of the United States, residing at Jackson, in the county of Jackson, State of Michigan, have invented certain new and useful Improvements in Flexible Pipes, of which the following is a specification.

This invention relates to improvements in flexible pipes.

My improvements are particularly designed by me as a substitute for the rubber coupling hose commonly employed on train pipes, and in the accompanying drawing I have illustrated my improvements as I have embodied them for that purpose. My improvements are, however, adapted for use in other relations where pipe joints are required.

The main objects of my invention are:

First, to provide an improved flexible pipe joint which is well adapted to withstand heavy pressures without leaking.

Second, to provide an improved flexible pipe joint having these advantages which is simple and economical in structure and very durable.

Third, to provide in a structure of the class described an improved gasket.

Further objects, and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is fully illustrated in the accompanying drawing forming a part of this specification, in which:

Fig. I is a detail side view of a train pipe embodying the features of my invention, parts being shown conventionally for convenience in illustrating.

Fig. II is a detail section on a line corresponding to the broken line 2—2 of Fig. I, the pipe sections being shown in full lines and partially broken away.

Fig. III is a vertical central section through one of my improved gaskets on a line corresponding to line 3—3 of Fig. IV.

Fig. IV is a perspective view of one of my improved gaskets.

Fig. V is a detail section corresponding to Fig. II, showing a modified form of gasket.

In the drawing the sectional views are taken looking in the direction of the little arrows at the ends of the section lines and similar numerals of reference refer to similar parts throughout the several views.

Referring to the drawing, 1 represents the car body. 2 is an air or steam pipe mounted thereon. It will be understood that it is now a common practice to attach flexible rubber hose to these train pipes, the hose being provided with couplings by means of which the pipes of adjacent cars may be joined. My improved flexible pipe is designed to be substituted for such flexible hose.

In the structure illustrated, I show two pipe sections, 3 and 4. These sections, 3 and 4, are connected by my improved coupling while the upper end of the section 3 is connected to the train pipe 2 by a similar coupling. I, therefore, illustrate and describe only one of the couplings in detail.

I provide a female joint member 5 and a coacting male joint member 6. The female joint member is provided with a laterally facing cylindrical socket 7, having an annular shoulder-like gasket seat 8 at the inner end thereof. The male joint member 6 is provided with a laterally projecting nipple 9 rotatably fitting within the female joint member. The gasket 10 is of substantial width and is provided with an outwardly tapering bore 11 having a cylindrical portion 12 at the inner end thereof. The outer corner of the gasket is chamfered at 13 providing an annular face 14 which contacts with the face of the nipple at a point spaced from the wall of the socket.

In the embodiment shown in Figs. II, III, and IV, the gasket is provided with a single annular peripheral groove 15, the groove being of downwardly tapering cross section terminating adjacent the inner end of the gasket. This provides a relatively thin wall at the inner end of the gasket so that when pressure is applied, that is, the pressure of the fluid within the pipe, the gasket is forced by such pressure firmly into contact with the walls of the socket, effectively preventing any leakage past the gasket.

The contacting end of the gasket being spaced from the wall on account of the chamfered edge, an edge or lip is provided which is also forced against the end of the nipple, thereby preventing leakage at that point.

In the modification shown in Fig. V a plurality of the peripheral grooves 15 are provided. This results in a plurality of relatively thin lip-like ribs which are forced by the pressure into contact with the wall of the socket.

My improved joint is very secure; that is, it is not likely to leak; it is very durable as there is little strain or wear upon the gasket. The joint members are held in engaging relation by means of the clip 16 adapted to be engaged upon the threaded stud 17 upon the female member and secured thereon by the castillated nut 18. A pin 19 on the member 5 assists in holding the clip in position. The clip engages a stud 20 on the coupling member 6, the stud being located in the axial line of the nipple so that the joint members are secured together for rotative movement.

I have illustrated and described my improvements in an adaptation which I have found very satisfactory for train pipe couplings. I have not attempted to illustrate or describe certain modifications or adaptations which might be desirable for pipe couplings for other purposes as I believe the disclosure made will enable those skilled in the art to which my invention relates to embody or adapt the same as may be desired.

Having thus described my invention, what I claim as new and desire to secure by Letters Patent is:

1. As an article of manufacture, a cylindrical annular gasket having an outwardly tapering bore with a cylindrical portion at the inner end thereof, and a plurality of annular peripheral grooves of downwardly tapering cross section, the inner edge of the inner groove terminating adjacent the inner end of the gasket, the outer corner of the gasket being chamfered.

2. As an article of manufacture, a cylindrical annular gasket having a plurality of annular peripheral grooves of downwardly tapering cross section, the inner edge of the groove terminating adjacent the inner end of the gasket.

3. As an article of manufacture, a cylindrical annular gasket having an outwardly tapering bore with a cylindrical portion at the inner end thereof, and an annular peripheral groove of downwardly tapering cross section, the inner edge of the groove terminating adjacent the inner end of the gasket, the outer corner of the gasket being chamfered.

4. As an article of manufacture, a cylindrical annular gasket having an annular peripheral groove of downwardly tapering cross section the inner edge of the groove terminating adjacent the inner end of the gasket.

5. As an article of manufacture, a cylindrical annular gasket having a plurality of annular peripheral grooves and an outwardly tapered bore with a cylindrical portion at the inner end thereof, the outer corner of the gasket being chamfered.

6. As an article of manufacture, a cylindrical annular gasket having an annular peripheral groove and an outwardly tapered bore with a cylindrical portion at the inner end thereof.

7. As an article of manufacture, a cylindrical annular gasket having an annular peripheral groove and an outwardly tapered bore, the outer corner of the gasket being chamfered.

8. As an article of manufacture, a cylindrical annular gasket having an outwardly tapered bore with a cylindrical bore at the inner end thereof, the walls of the tapered bore being substantially thicker than the walls of the cylindrical bore, there being an annular peripheral groove the inner edge of which is adjacent the inner end of the gasket, the outer corner of the gasket being chamfered.

9. As an article of manufacture, a cylindrical annular gasket having an outwardly tapered bore with a cylindrical bore at the inner end thereof, the walls of the tapered bore being substantially thicker than the walls of the cylindrical bore, there being an annular peripheral groove the inner edge of which is adjacent the inner end of the gasket.

10. As an article of manufacture, a cylindrical annular gasket having an outwardly tapered bore with a cylindrical bore at the inner end thereof, the walls of the tapered bore being substantially thicker than the walls of the cylindrical bore, the outer corner of the gasket being chamfered.

In witness whereof, I have hereunto set my hand and seal.

JOHN HENRY PHILLIPS, Jr. [L. S.]